(12) United States Patent
Um

(10) Patent No.: US 7,691,525 B2
(45) Date of Patent: Apr. 6, 2010

(54) SECONDARY BATTERY

(75) Inventor: Jae Chul Um, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1317 days.

(21) Appl. No.: 11/170,783

(22) Filed: Jun. 28, 2005

(65) Prior Publication Data
US 2006/0008699 A1  Jan. 12, 2006

(30) Foreign Application Priority Data
Jun. 28, 2004 (KR) .................. 10-2004-0048996

(51) Int. Cl.
H01M 10/48 (2006.01)

(52) U.S. Cl. .................. 429/90; 429/91; 429/92; 429/93; 429/62

(58) Field of Classification Search .................. 429/62, 429/90, 91, 92, 93
See application file for complete search history.

(56) References Cited

U.S. PATENT DOCUMENTS 5,789,100 A * 8/1998 Burroughs et al. .......... 429/90
6,977,123 B1 * 12/2005 Burroughs et al. .......... 429/92

FOREIGN PATENT DOCUMENTS

| GB | 1437752 | * | 6/1976 |
| JP | 4-292871 | * | 10/1992 |
| JP | 11-191438 | * | 7/1999 |
| JP | 2000-208114 | * | 7/2000 |
| JP | 2000-277061 | * | 10/2000 |
| JP | 2005-50744 | * | 2/2005 |

OTHER PUBLICATIONS

Patent Abstracts of Japan, Publication No. 11-191438; Date of Publication: Jul. 13, 1999; in the name of Takahiko Uesugi et al.

* cited by examiner

Primary Examiner—Laura S Weiner
(74) Attorney, Agent, or Firm—Christie, Parker & Hale, LLP

(57) ABSTRACT

A secondary battery comprising a heat-sensitive indicator on the outer surface of the battery is disclosed. The color of the heat-sensitive indicator changes according to battery temperature. The heat-sensitive indicator may comprise a sheath. When the internal temperature of the battery increases rapidly, the heat-sensitive indicator changes color to alert the user that the battery is abnormally hot.

25 Claims, 5 Drawing Sheets

SECONDARY BATTERY

CROSS REFERENCE TO RELATED APPLICATION

This application claims priority to and the benefit of Korean Patent Application No. 2004-0048996, filed Jun. 28, 2004 in the Korean Intellectual Property Office, the entire content of which is incorporated herein by reference.

FIELD OF THE INVENTION

The present invention relates to a secondary battery. More particularly, the present invention relates to a lithium secondary battery comprising a heat-sensitive indicator which changes color in response to changes in battery temperature.

BACKGROUND OF THE INVENTION

Generally, secondary batteries are batteries that can be charged and discharged. In contrast, primary batteries are those that cannot be charged. Secondary batteries are widely used in advanced electronic devices, including cellular phones, notebook computers, camcorders, etc. Particularly, lithium secondary batteries have driving voltages of 3.6 V or more. These driving voltages are three times greater than those of nickel-cadmium (Ni—Cd) batteries or nickel-metal hydride (Ni-MH) batteries, which are currently used as power sources for portable electronic devices. Further, lithium secondary batteries have relatively high energy densities per unit mass. Therefore, lithium ion secondary batteries have been increasingly and extensively researched and developed.

Lithium secondary batteries have conventionally used lithium-containing oxides as cathode active materials and carbonaceous materials as anode active materials. Generally, lithium secondary batteries are classified into liquid electrolyte-based batteries and polymer electrolyte-based batteries, according to the type of electrolyte used. Batteries using a liquid electrolyte are referred to as lithium ion batteries and batteries using a polymer electrolyte are referred to as lithium polymer batteries.

A lithium secondary battery generally comprises an electrode assembly comprising a cathode, an anode and a separator positioned between the cathode and anode. The lithium secondary battery is formed by winding the electrode assembly into a jelly roll shape. The wound electrode assembly is then inserted into a can which generally comprises aluminum or an aluminum alloy. The can is then closed with a cap assembly, and an electrolyte is injected into the can. The can is then sealed. The battery further comprises a sheath on the outer surface of the can. The sheath protects and insulates the battery from the external environment. Generally, this insulating sheath comprises a material that shrinks with heat, such as polyvinyl chloride (PVC). The sheath is attached to the battery by heating, thereby creating a complete battery.

Batteries are energy sources and have the potential to discharge large amounts of energy. Secondary batteries store large amounts of energy during charging. Also, secondary batteries require external energy sources during charging for supplying the energy to be stored in the battery. When abnormalities occur during charging a secondary battery, such as internal short circuits, the battery may rapidly discharge the stored energy, causing safety-related problems such as fire, explosion, and the like.

Additionally, due to the high activity of Li, lithium secondary batteries may undergo rapid exothermic reactions when exposed to small amounts of water contained in an electrolyte, as depicted in Formula (1) below. When it is not exposed to water, lithium reduces and precipitates during charging and discharging, as depicted in Formula (2) below. This reduction and precipitation of lithium causes short circuits between the cathode and anode. Therefore, lithium secondary batteries which do not charge or discharge property create high risks of fire or explosion.

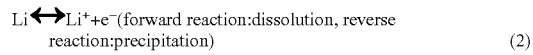

Accordingly, secondary batteries are generally equipped with various safety devices for preventing fire or explosion caused by abnormal charging. For example, certain safety devices interrupt electric current when the battery temperature is too high or when the voltage increases too rapidly due to overcharging or over-discharging. Such safety devices prevent dangers such as explosion and fire. Some examples of safety devices include protective circuit boards that detect abnormal electric current or voltage and that interrupt electric current, Positive Temperature Coefficient (PTC) devices that are activated upon overheating due to abnormal electric current, and bimetal devices.

However, even when secondary batteries are equipped with such safety devices, users cannot visually detect abnormal and rapid increases in temperature during charging and discharging. Therefore, users cannot easily determine whether the battery is operating improperly. Additionally, secondary batteries can be misused in several ways, including user misuse, use with a malfunctioning charger, and use contrary to prescriptions for normal use. When such misuse occurs, for example during overcharging, the battery may ignite or explode. Further, contacting a coin or necklace with an external connection terminal may cause the battery to ignite or explode. However, it is difficult to detect these abnormalities so as to prevent dangerous occurrences such as battery breakdown and ignition.

SUMMARY OF THE INVENTION

In one embodiment of the present invention, a secondary battery comprises a heat-sensitive indicator that changes color when the internal temperature of the battery increases too rapidly. This construction enables users to visually detect whether the battery is abnormally hot. The heat-sensitive indicator is attached to the outer surface of the battery and changes color according to battery temperature.

The heat-sensitive indicator changes color when the temperature of the battery reaches 80° C. or higher. However, the heat-sensitive indicator may change colors continuously according to variations in battery temperature.

BRIEF DESCRIPTION OF THE DRAWINGS

The above and other features and advantages of the present invention will become more apparent by reference to the following detailed description when considered in conjunction with the accompanying drawings, in which.

DETAILED DESCRIPTION

Figure 1:
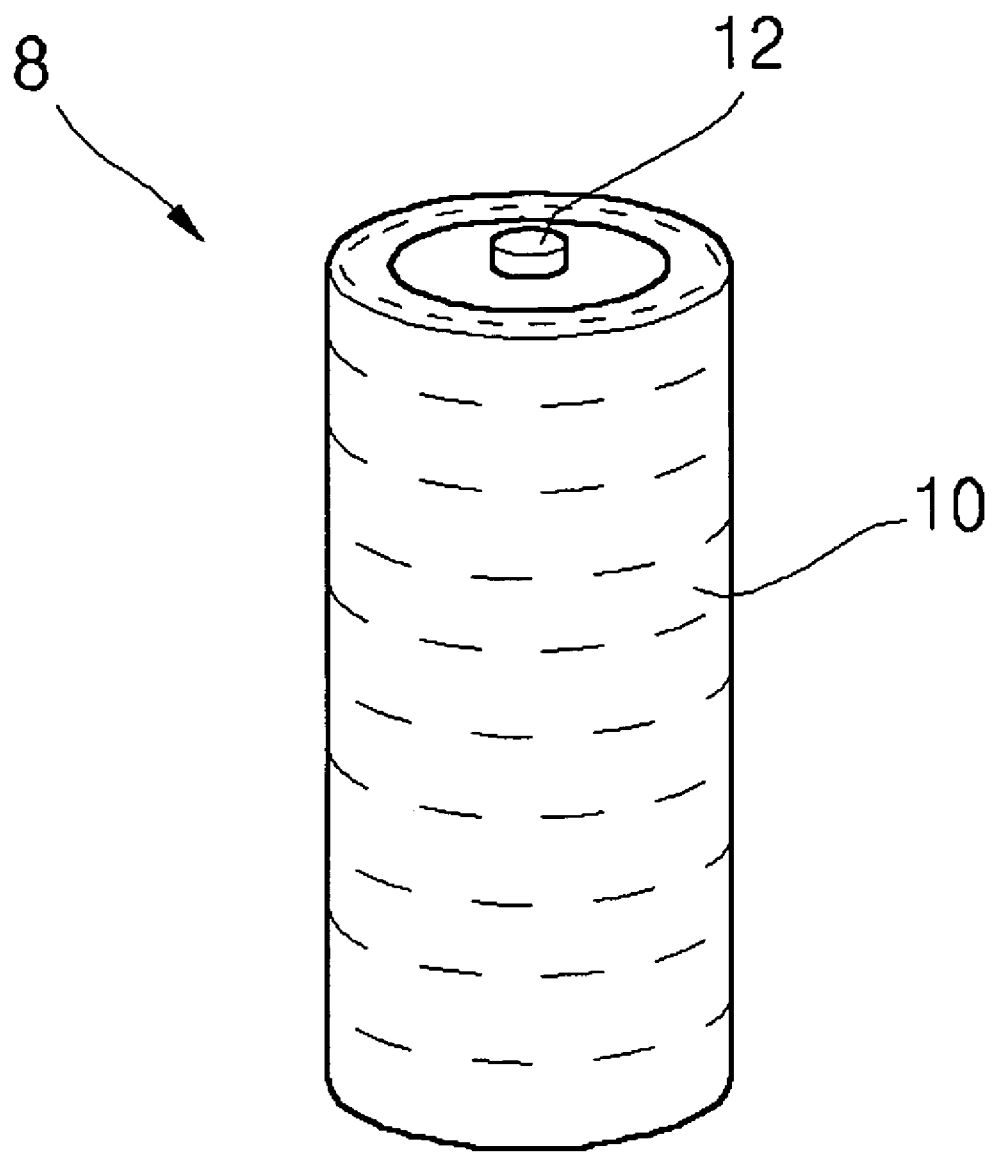
FIG. 1 is a perspective view of a cylindrical secondary battery comprising a heat-sensitive indicator according to one embodiment of the present invention.

Exemplary embodiments of the present invention will now be described with reference to the accompanying drawings. In the following description and accompanying drawings, like reference numerals are used to designate like components in order to omit repetitive descriptions of same or similar components.

Figure 2:
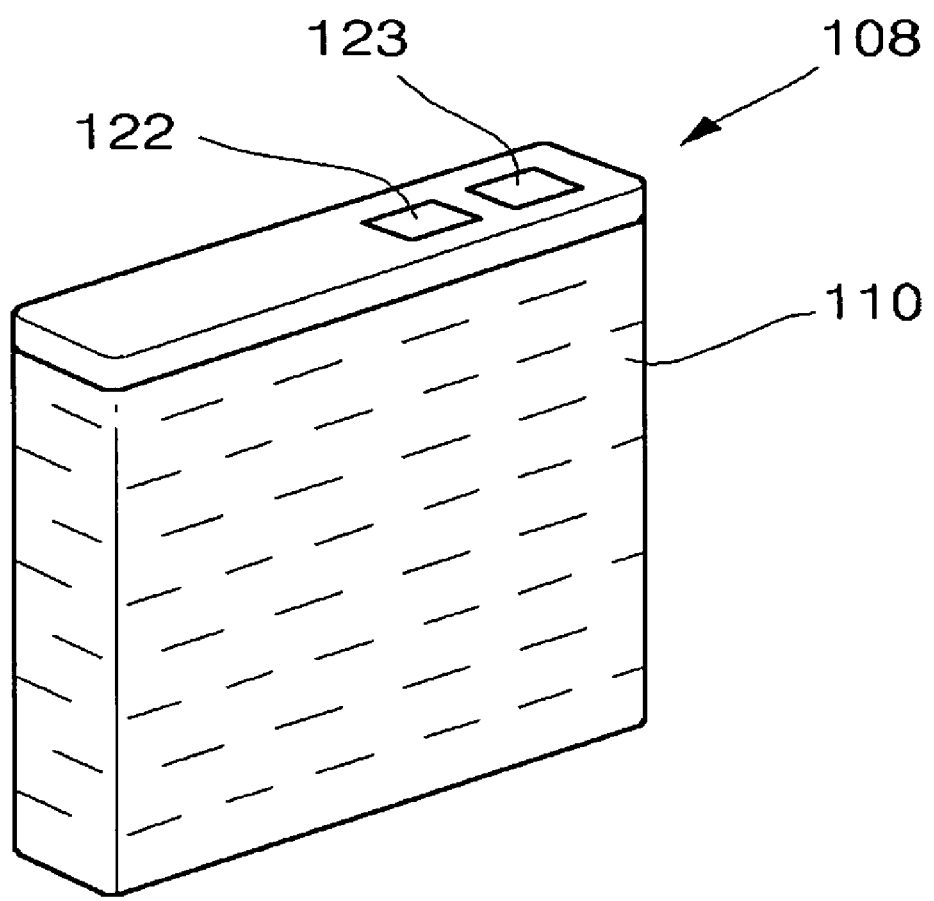
FIG. 2 is a perspective view of a prismatic secondary battery comprising a heat-sensitive indicator according to another embodiment of the present invention.

FIG. 1 is a perspective view of a cylindrical secondary battery comprising a heat-sensitive indicator according to one exemplary embodiment of the present invention. FIG. 2 is a perspective view of a prismatic secondary battery comprising a heat-sensitive indicator according to another exemplary embodiment of the present invention. As shown in FIG. 1, an exemplary cylindrical secondary battery 8 comprises a heat-sensitive indicator 10 mounted on an outer surface of the battery 8. As shown FIG. 2, an exemplary prismatic battery 108 comprises a heat-sensitive indicator 110 mounted on an outer surface of the battery 108. In one embodiment, heat-sensitive indicators 10 and 110 comprise sheaths wrapped around the entire outer surfaces of the respective batteries.

As shown in FIG. 1, the cylindrical battery 8 comprises a cathode terminal 12 which is exposed to the exterior of the battery. As shown in FIG. 2, the prismatic secondary battery 108 comprises external input/output (I/O) terminals 122 and 123 which are exposed to the exterior of the battery. Each heat-sensitive indicator 10 and 110 changes color in response to an abnormal increase in battery temperature. As such, the heat-sensitive indicators 10 and 110 not only insulate and protect the battery from the external environment, but also detect the heat emission of the battery.

According to one embodiment of the present invention, the heat-sensitive indicator is mounted on an outer surface of a secondary battery. The secondary battery may comprise any suitable case for housing an electrode assembly. Nonlimiting examples of suitable secondary batteries include cans, pouches and packs.

Secondary batteries can be charged at temperatures ranging from about −20° C. to about 60° C., and discharged at temperatures ranging from about 0° C. to about 45° C. However, the internal temperature of the secondary battery may increase rapidly to 80° C. or higher upon battery malfunction, such as overcharging or short circuiting. When the internal temperature of the secondary battery rapidly and abnormally increases, the heat-sensitive indicator changes color to alert users to the abnormal state of the secondary battery.

The heat-sensitive indicator according to one embodiment of the present invention comprises a substance having a specific wavelength defined by its molecular structure or electron density. When in a stable state, this substance maintains its color. However, the substance changes color in response to changes in electron density, temperature or acidity. The substance may also change color when pressure or electric current is applied, when exposed to UV light, or when exposed to water or the like. More particularly, the heat-sensitive indicator according to the present invention comprises a thermochromic material that undergoes either a reversible or an irreversible color change. The color change can be either a color development, a color extinction or a color shift (e.g., from yellow to blue). The color change occurs when the temperature increases or decreases relative to a predetermined reference temperature. The heat-sensitive indicator may undergo either a reversible or irreversible change in color depending on the reversibility or irreversibility of the thermochromic material used.

Rapid temperature increases can occur in secondary batteries that have been stabilized through charging, aging and discharging. The rapid temperature increases can be caused by internal short circuits. However, these abnormal temperature increases are difficult to detect in stabilized batteries and cause deterioration in battery performance. Furthermore, these temperature increases cause safety-related problems such as fire. Therefore, it is important to identify batteries that may develop these problems.

In one embodiment of the present invention, the thermochromic material used in the heat-sensitive indicator undergoes an irreversible color change. Specifically, when the thermochromic heat-sensitive indicator changes color in response to an abnormal temperature increase in the secondary battery, the heat-sensitive indicator will not return to its original color even if the temperature subsequently decreases. This enables quick classification of batteries by capacity and identification of those batteries that are in abnormal states.

In another embodiment, the thermochromic material used in the heat-sensitive indicator undergoes a reversible color change. Specifically, when the battery temperature increases in response to an increase in outside temperature, the thermochromic heat-sensitive indicator can return to its original color when the battery temperature decreases below a predetermined temperature. The battery temperature may increase in response to increases in outside temperature particularly when the battery is used under a high-temperature environment. The thermochromic heat-sensitive indicator according to this embodiment enables the user to check battery temperature conditions before use, thereby enabling the user to prevent the problems that may occur from increases in battery temperature.

Either reversible or irreversible thermochromic materials may be used in the heat-sensitive indicators according to the present invention. Whether the thermochromic material is reversible or irreversible depends on whether the indicator is used to identify batteries based on capacity, to exclude those batteries that are in abnormal states, or to check battery temperature conditions and warn of heat emission.

According to one embodiment of the present invention, a heat-sensitive indicator is used that changes color when the temperature increase in a secondary battery rapidly increases to about 80° C. or higher. The heat-sensitive indicator may change color continuously at specified intervals depending on variations in battery temperature. For example, when the temperature of the battery increases to between about 80 and 90° C., the color of the heat-sensitive indicator may change from green to blue. If the temperature increases again to between about 90 and 100° C., the color may change from blue to red. Also, upon further increases in temperature, the color may change again.

Such continuous color changes may occur in the entire heat-sensitive indicator. Alternatively, the heat-sensitive indicator may comprise several color changing regions, each color changing region changing color at separate temperatures. In this configuration, the heat-sensitive indicator undergoes a stepped color change. Also, each color changing region may change color either reversibly or irreversibly. Additionally, some color changing regions may undergo reversible color changes while other color changing regions may undergo irreversible color changes.

In one embodiment, the heat-sensitive indicator comprises either a reversible or irreversible thermochromic material which undergoes a color change when the temperature increases by about 5 to about 10° C. beyond a predetermined reference temperature.

Alternatively, the heat-sensitive indicator may comprise a combination of a reversible thermochromic material and an irreversible thermochromic material. In this configuration, a reversible color change may occur when the battery temperature increases beyond a first predetermined reference temperature, and an irreversible color change may occur when the battery temperature increases beyond a second predetermined reference temperature. For example, a reversible color change may occur when the battery temperature increases to between about 80 and about 90° C., and an irreversible color change may occur when the temperature increases to between about 90 and about 100° C.

Figure 3:
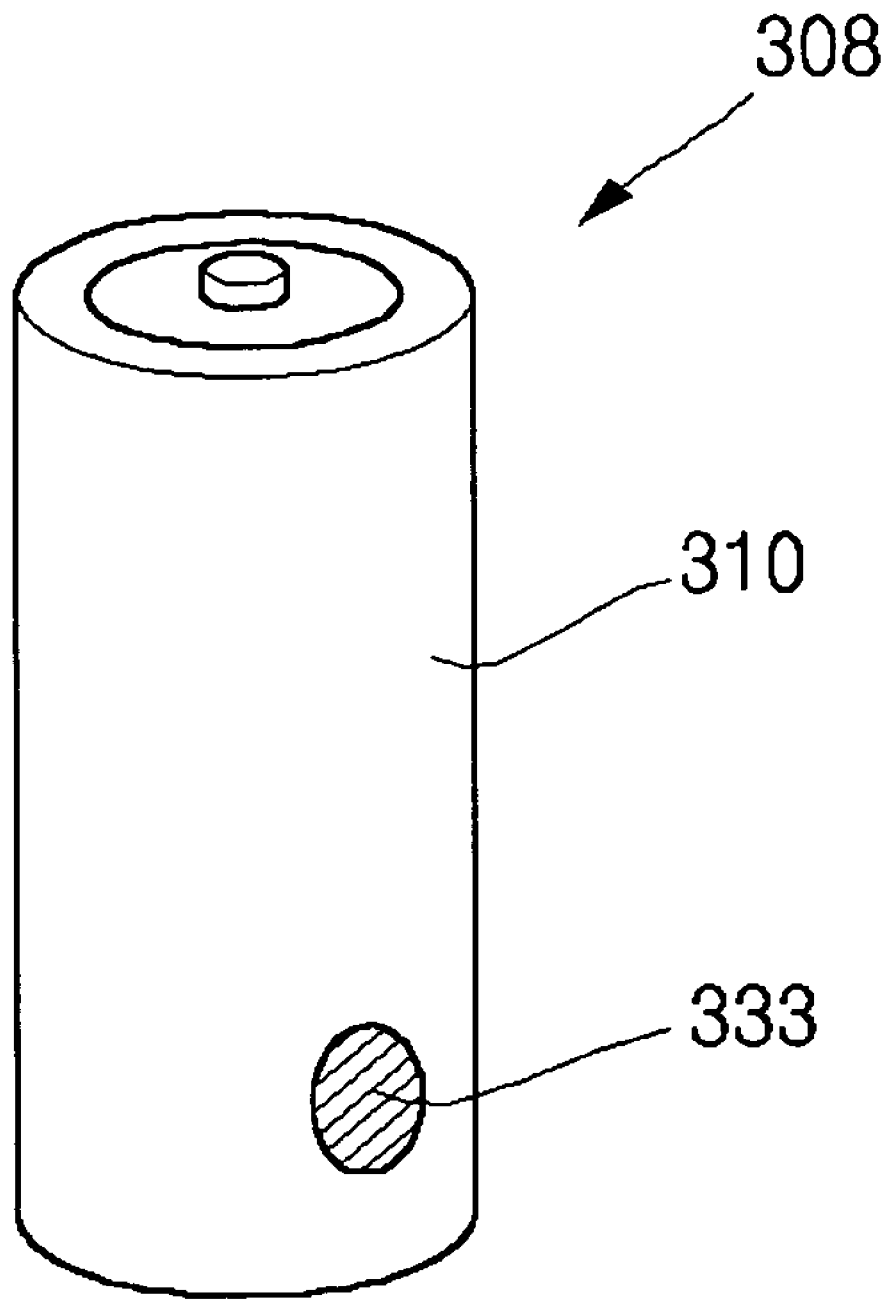
FIG. 3 is a perspective view of a cylindrical secondary battery comprising a heat-sensitive indicator according to yet another embodiment of the present invention.
Figure 4:
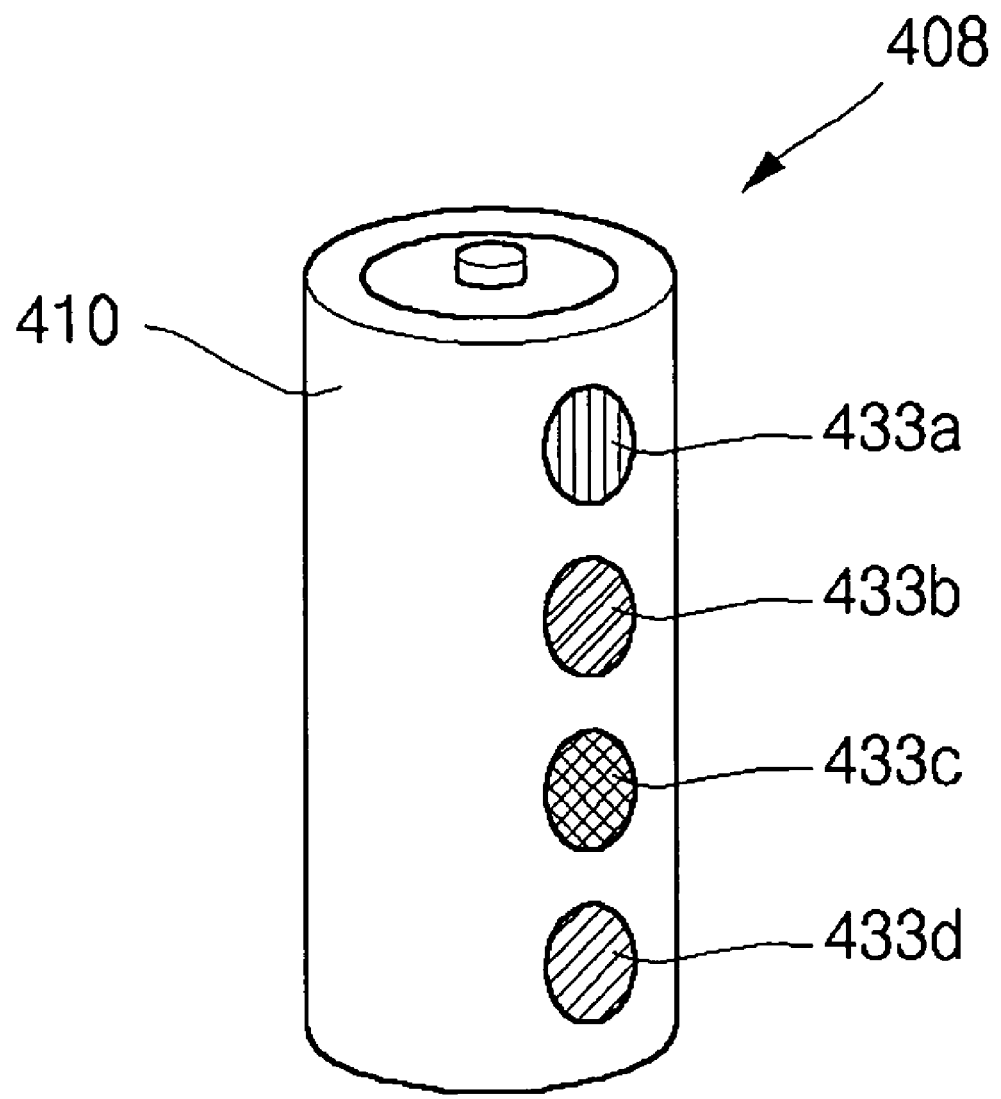
FIG. 4 is a perspective view of a cylindrical secondary battery comprising a heat-sensitive indicator according to still another embodiment of the present invention.
Figure 5:
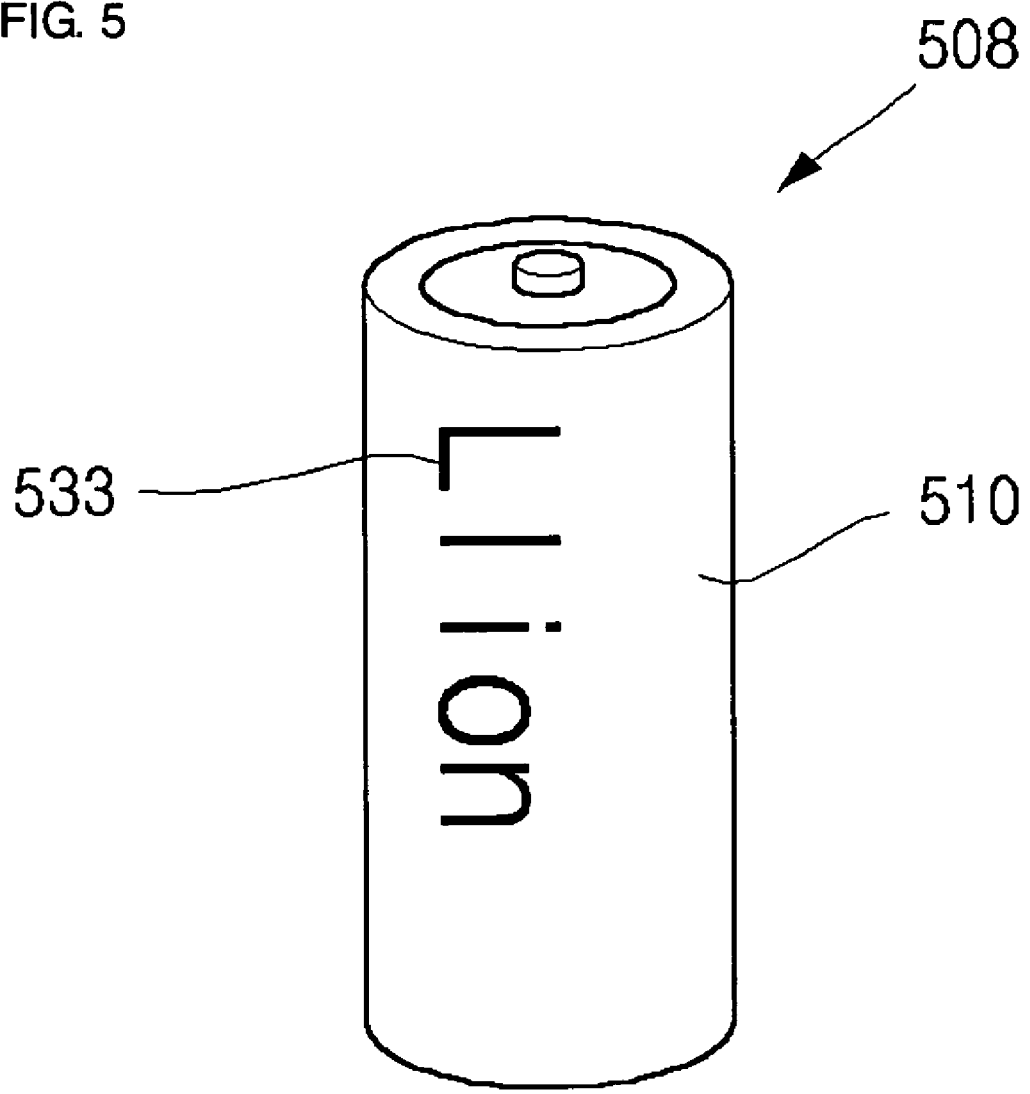
FIG. 5 is a perspective view of a cylindrical secondary battery comprising a heat-sensitive indicator according to still yet another embodiment of the present invention.

FIGS. 3 through 5 are perspective views of alternative embodiments of cylindrical secondary batteries comprising alternative embodiments of the heat-sensitive indicator. As discussed above, the entire heat-sensitive indicator may undergo a color change in response to temperature increases in the battery. However, as shown in FIG. 3, the heat-sensitive indicator 310 of the battery 308 may comprise at least one color changing region 333. In this embodiment, only the color changing region 333, and not the entire heat-sensitive indicator 310, undergoes a color change in response to increases in battery temperature.

FIG. 4 is a perspective view of an alternative secondary battery 408 comprising a heat-sensitive indicator 410 comprising a plurality of color changing regions 433a, 433b, 433c and 433d. Although FIG. 4 shows four color changing regions, it is understood that any desired number of color changing regions may be used. Each of the color changing regions 433a, 433b, 433c and 433d may change colors either at the same temperature or at different temperatures. Additionally, each of the color changing regions 433a, 433b, 433c and 433d may undergo either reversible or irreversible color changes.

As shown in FIG. 5, another alternative secondary battery 508 may comprise a heat-sensitive indicator 510 comprising a color changing region 533 having a pattern. The color changing region 533 may take any desired pattern, for example letters, figures, numbers, marks, and the like. The pattern may also include a product name or trade name. The pattern of the color changing region 533 on the heat-sensitive indicator 510 changes color in response to temperature increases, enabling users to detect battery heat emission.

The heat-sensitive indicator according to one embodiment of the present invention may comprise a thermoplastic resin film comprising at least one reversible or irreversible thermochromic material. Nonlimiting examples of suitable thermoplastic resin films include polyvinyl chloride, polyethylene, polypropylene, polyethylene terephthalate, polyamide, and the like.

The heat-sensitive indicator may be formed by completely coating a thermoplastic resin film with a thermochromic material. Alternatively, the heat-sensitive indicator may be formed by coating only a region or a plurality of regions of the thermoplastic resin film with a thermochromic material. The thermochromic material may be coated on the film in a desired pattern such as letters, figures, numbers, marks, etc. For example, the pattern may comprise a product name or a trade name.

In an alternative embodiment, the heat-sensitive indicator is formed by first mixing a thermochromic material with a thermoplastic resin and dispersing the thermochromic material in the thermoplastic resin. The dispersed mixture is then formed into a film to provide a heat-sensitive indicator.

In another alternative embodiment, the heat-sensitive indicator is formed by first forming a thermochromic material into a label. The label is then attached to a thermoplastic resin film to provide a heat-sensitive indicator.

Thermochromic materials suitable for use in the present invention include the following categories of materials: (i) crystals of metal complex salts; (ii) cholesteric liquid crystals; (iii) ternary compositions including electron-donating color developers, compounds having phenolic hydroxyl groups and compounds having alcoholic hydroxyl groups; (iv) ternary compositions including electron-donating organic nitrogen compounds such as phthalein and fluorescein, alcohols and acid amides; and (v) compositions including polyhydroxy compounds, alkali metal borates and pH-indicating pigments. Any thermochromic material may be used with the present invention. For example, a thermochromic material may be used which undergoes a color change when the internal battery temperature reaches about 80° C. or higher.

Additionally, reversible thermochromic materials may be used with the present invention. Reversible thermochromic materials suitable for use in the present invention include the following categories of materials: (a) electron-donating color developers, (b) 1,2,3-triazole compounds, (c) azomethine compounds and primary amine salts of carboxylic acids and (d) alcohol solvents.

Nonlimiting examples of suitable electron-donating color developers for use with the present invention include 3,3'-dimethoxyfluoran (yellow), 3-chloro-6-phenylaminofluoran (orange), 3-diethylamino-6-methyl-7-chlorofluoran (vermilion), 3-diethyl-7,8-benzofluoran (pink), Rhodamine B Lactone (red), Crystal Violet Lactone ("CVL") (blue), Malachite Green Lactone (green), 3,3'-bis-(para-dimethylaminophenyl) phthalide (green), 3-diethylamino-6-methyl-7-phenylaminofluoran (black), and the like. The electron-donating color developer may be present in the heat-sensitive indicator in an amount ranging from about 1 to about 20 wt % based on the total weight of the heat-sensitive indicator.

Nonlimiting examples of suitable 1,2,3-triazole compounds for use with the present invention include 1,2,3-benzotriazole, 4(5)-hydroxy-1,2,3-triazole, 4(7)-nitro-1,2,3-benzotriazole, 5-methoxy-7-nitro-1,2,3-benzotriazole, 4-amino-1,2,3-benzotriazole, and the like. The 1,2,3-triazole compound may be present in the heat-sensitive indicator in an amount ranging from about 0.1 to about 40 wt % based on the total weight of the heat-sensitive indicator.

Nonlimiting examples of suitable azomethine compounds for use with the present invention include benzylidene para-anisidine, para-methoxybenzylidene para-ethoxyaniline, para-methoxybenzylidene ortho-anisidine, and the like. The azomethine compound may be present in the heat-sensitive indicator in an amount ranging from about 0.5 to about 50 wt % based on the total weight of the heat-sensitive indicator.

Nonlimiting examples of suitable primary amine salts of carboxylic acids for use with the present invention include stearic acid stearylamine, stearic acid myristylamine, behenic acid stearylamine, behenic acid myristylamine, myristic acid stearylamine, myristic acid myristylamine, and the like. The primary salt of a carboxylic acid may be present in the heat-sensitive indicator in an amount ranging from about 0.5 to about 50 wt % based on the total weight of the heat-sensitive indicator.

Nonlimiting examples of suitable alcohol solvents for use with the present invention include stearyl alcohol, myristyl alcohol, cetyl alcohol, and the like. The alcohol solvent may be present in the heat-sensitive indicator in an amount ranging from about 1 to about 50 wt % based on the total weight of the heat-sensitive indicator.

Nonlimiting examples of suitable thermochromic materials for use with the present invention are listed in Table 1 below. Table 1 also lists the temperature at which the listed materials undergo a color change and lists the color change.

TABLE 1

| Electron-donating color developer (4 parts by weight) | 1,2,3-triazole compound (16 parts by weight) | Azomethine (30 parts by weight) | Primary amine salt of carboxylic acid (30 parts by weight) | Alcohol (50 parts by weight) | Color-change temperature & type |
|---|---|---|---|---|---|
| Crystal Violet Lactone | 1,2,3-benzotriazole | $C_6H_4CH=NC_6H_4(p\text{-}OCH_3)$ (benzylidene p-anisidine) | | myristyl alcohol | 61° C. blue→colorless |
| Crystal Violet Lactone | 1,2,3-benzotriazole | $C_6H_4(p\text{-}OCH_3)CH=NC_6H_4(p\text{-}OC_2H_5)$ (p-methoxybenzylidene p-ethoxyaniline) | | myristyl alcohol | 110° C. blue→colorless |
| Crystal Violet Lactone | 1,2,3-benzotriazole | $C_6H_4(p\text{-}OCH_3)CH=NC_6H_4(o\text{-}OCH_3)$ (p-methoxybenzylidene o-anisidine) | | myristyl alcohol | 130° C. blue→colorless |
| Crystal Violet Lactone | 1,2,3-benzotriazole | | myristic acid myristyl amine | myristyl alcohol | 66° C. blue→colorless |
| Crystal Violet Lactone | 1,2,3-benzotriazole | | myristic acid stearyl amine | myristyl alcohol | 67° C. blue→colorless |
| Crystal Violet Lactone | 1,2,3-benzotriazole | | stearic acid myristyl amine | myristyl alcohol | 69° C. blue→colorless |
| Crystal Violet Lactone | 1,2,3-benzotriazole | | stearic acid stearyl amine | myristyl alcohol | 78° C. blue→colorless |
| Crystal Violet Lactone | 1,2,3-benzotriazole | | behenic acid myristyl amine | myristyl alcohol | 69° C. blue→colorless |
| Crystal Violet Lactone | 1,2,3-benzotriazole | | behenic acid stearyl amine | myristyl alcohol | 78° C. blue→colorless |

In one embodiment of the present invention, a single thermochromic material is used. Alternatively, a mixture of at least two thermochromic materials is used. When a mixture is used, each thermochromic material may undergo a color change at a different temperature. When a mixture of thermochromic materials is used, the resulting color change may differ from the color change of either of the thermochromic materials used alone. For example, when a thermochromic material which changes color from blue to colorless at about 80° C. is combined with a thermochromic material which changes color from red to colorless at about 100° C., the result is a first change in color from a mixed blue/red color to red at about 80° C., and a second change in color to colorless at about 100° C.

In an alternative embodiment, a pigment that does not undergo a color change in response to variations in temperature is combined with a thermochromic material. When such a combination is used, the heat-sensitive indicator shows a mixed color at 80° C. which comprises the color of the pigment and the color of the thermochromic material. For example, when a pigment is combined with a thermochromic material which changes color from blue to colorless, the resulting heat-sensitive indicator shows a mixed color at temperatures under 80° C. When the temperature increases above 80° C., the color of the thermochromic material extinguishes, and the heat-sensitive indicator shows only the color of the pigment.

The secondary batteries according to the present invention comprise heat-sensitive indicators which change color in response to increases in battery temperature. The heat-sensitive indicators according to the present invention enable users to visually detect whether a battery is abnormally hot. The internal temperature of the battery can rapidly increase due to abnormal conditions such as overcharging or short circuiting.

Exemplary embodiments of the present invention have been described for illustrative purposes. However, those skilled in the art will appreciate that various modifications, additions and substitutions can be made without departing from the scope and spirit of the invention as disclosed in the accompanying claims.

What is claimed is:

1. A secondary battery comprising a heat-sensitive indicator mounted on an outer surface of the battery, wherein the heat-sensitive indicator comprises a plurality of color changing regions, wherein each color changing region changes color in response to an increase in a temperature of the battery, each color changing region changes color at a different temperature, and each color changing region changes color at a battery temperature of about 80° C. or higher.

2. The secondary battery as claimed in claim 1, wherein at least one color changing region changes color continuously at predetermined temperature intervals.

3. The secondary battery as claimed in claim 1, wherein the plurality of color changing regions comprises four color changing regions.

4. The secondary battery as claimed in claim 1, wherein the heat-sensitive indicator comprises a sheath comprising the plurality of color changing regions.

5. The secondary battery as claimed in claim 1, wherein the change in color of at least one of the color changing regions is reversible.

6. The secondary battery as claimed in claim 1, wherein the change in color of at least one of the color changing regions is irreversible.

7. A secondary battery, comprising a heat-sensitive indicator mounted on an outer surface of the battery, wherein the heat-sensitive indicator comprises a plurality of color changing regions, wherein each color changing region changes color in response to an increase in a temperature of the battery, each color changing region changes color at a battery temperature of about 61° C. or higher, and wherein at least one of the color changing regions comprises a pattern.

8. The secondary battery as claimed in claim 7, wherein the pattern is selected from the group consisting of letters, figures, numbers, marks and combinations thereof.

9. A secondary battery comprising a heat-sensitive indicator mounted on an outer surface of the battery, wherein the heat-sensitive indicator changes color in response to an increase in a temperature of the battery and comprises a thermoplastic resin film comprising a plurality of color changing regions, each region coated with a different thermochromic material, wherein each color changing region changes color at a battery temperature of about 61° C. or higher.

10. The secondary battery as claimed in claim 9, wherein the thermoplastic resin film is selected from the group consisting of polyvinyl chloride, polyethylene, polypropylene, polyethylene terephthalate, polyamide and mixtures thereof.

11. The secondary battery as claimed in claim 9, wherein each thermochromic material comprises a label and the label is attached to the thermoplastic resin film.

12. A secondary battery, comprising a heat-sensitive indicator mounted on an outer surface of the battery, wherein the heat-sensitive indicator changes color in response to an increase in a temperature of the battery and comprises a thermoplastic resin film completely coated with a thermochromic material, wherein the heat-sensitive indicator changes color at a battery temperature of about 61° C. or higher.

13. A secondary battery, comprising a heat-sensitive indicator mounted on an outer surface of the battery, wherein the heat-sensitive indicator changes color in response to an increase in a temperature of the battery and comprises a thermoplastic resin film and at least one thermochromic material coated on the thermoplastic resin to form a pattern, wherein the heat-sensitive indicator changes color at a battery temperature of about 61° C. or higher.

14. A secondary battery comprising a heat-sensitive indicator mounted on an outer surface of the battery, wherein the heat-sensitive indicator changes color in response to an increase in a temperature of the battery and comprises a thermoplastic resin film and at least two thermochromic materials that change colors at different temperatures, wherein each thermochromic material changes color at a battery temperature of about 61° C. or higher.

15. A secondary battery comprising a heat-sensitive indicator mounted on an outer surface of the battery, wherein the heat-sensitive indicator changes color in response to an increase in a temperature of the battery and comprises a thermoplastic resin film and at least one thermochromic material, wherein the thermochromic material is selected from the group consisting of electron-donating color developers, 1,2,3-triazole compounds, azomethine compounds, primary amine salts of carboxylic acids, alcohol solvents, and mixtures thereof, and wherein the heat-sensitive indicator changes color at a battery temperature of about 61° C. or higher.

16. The secondary battery as claimed in claim 15, wherein the thermochromic material comprises an electron-donating color developer, and the electron-donating color developer is present in the heat-sensitive indicator in an amount ranging from about 1 to about 20 wt % based on the total weight of the heat-sensitive indicator.

17. The secondary battery as claimed in claim 15, wherein the thermochromic material comprises a 1,2,3-triazole compound, and the 1,2,3-triazole compound is present in the heat-sensitive indicator in an amount ranging from about 0.1 to about 40 wt % based on the total weight of the heat-sensitive indicator.

18. The secondary battery as claimed in claim 15, wherein the thermochromic material comprises an azomethine compound, and the azomethine compound is present in the heat-sensitive indicator in an amount ranging from about 0.5 to about 50 wt % based on the total weight of the heat-sensitive indicator.

19. The secondary battery as claimed in claim 15, wherein the thermochromic material comprises a primary amine salt of a carboxylic acid, and the primary amine salt of a carboxylic acid is present in the heat-sensitive indicator in an amount ranging from about 0.5 to about 50 wt % based on the total weight of the heat-sensitive indicator.

20. The secondary battery as claimed in claim 15, wherein the thermochromic material comprises an alcohol solvent, and the alcohol solvent is present in the heat-sensitive indicator in an amount ranging from about 1 to about 50 wt % based on the total weight of the heat-sensitive indicator.

21. The secondary battery as claimed in claim 15, wherein the thermochromic material comprises an electron-donating color developer selected from the group consisting of 3,3'-dimethoxyfluoran, 3-chloro-6-phenylaminofluoran, 3-diethylamino-6-methyl-7-chlorofluoran, 3-diethyl-7,8-benzofluoran, Rhodamine B Lactone, Crystal Violet Lactone, Green Lactone, 3,3'-bis-(para-dimethylaminophenyl)phthalide, 3-diethylamino-6-methyl-7-phenylaminofluoran and mixtures thereof.

22. The secondary battery as claimed in claim 15, wherein the thermochromic material comprises a 1,2,3-trizazole compound selected from the group consisting of 1,2,3-benzotriazole, 4(5)-hydroxy-1,2,3-triazole, 4(7)-nitro-1,2,3-benzotriazole, 5-methoxy-7-nitro-1,2,3-benzotriazole, 4-amino-1,2,3-benzotriazole and mixtures thereof.

23. The secondary battery as claimed in claim 15, wherein the thermochromic material comprises an azomethine compound selected from the group consisting of benzylidene para-anisidine, para-methoxybenzylidene para-ethoxyaniline, para-methoxybenzylidene ortho-anisidine and mixtures thereof.

24. The secondary battery as claimed in claim 15, wherein the thermochromic material comprises a primary amine salt of a carboxylic acid selected from the group consisting of stearic acid stearylamine, stearic acid myristylamine, behenic acid stearylamine, behenic acid myristylamine, myristic acid stearylamine and myristic acid myristylamine.

25. The secondary battery as claimed in claim 15, wherein the thermochromic material comprises an alcohol solvent selected from the group consisting of stearyl alcohol, myristyl alcohol, cetyl alcohol and mixtures thereof.

* * * * *